Sept. 10, 1963 W. A. PREUSS 3,103,283
APPARATUS FOR FEEDING PARTS
Filed Aug. 8, 1960 4 Sheets-Sheet 1
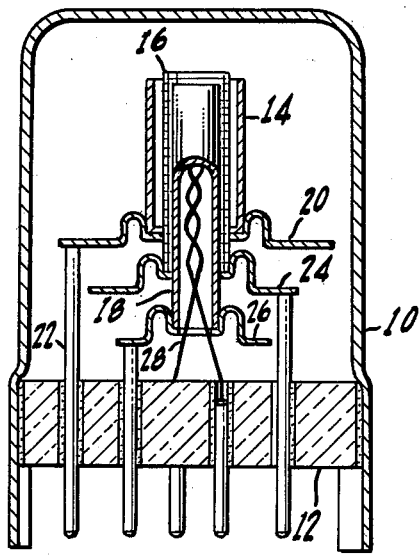
_Fig_1_
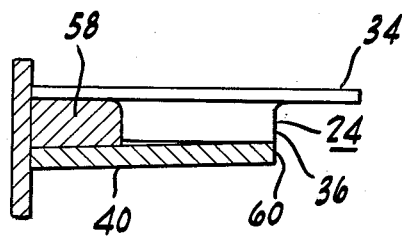
_Fig_3_
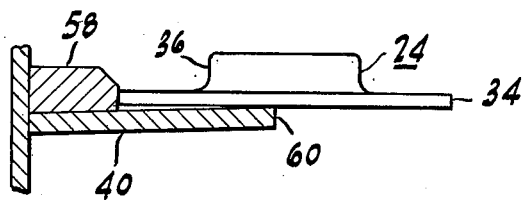
_Fig_4_
INVENTOR.
WALTER A. PREUSS
BY
William A. Zalesak
ATTORNEY Sept. 10, 1963    W. A. PREUSS    3,103,283
APPARATUS FOR FEEDING PARTS
Filed Aug. 8, 1960    4 Sheets-Sheet 3
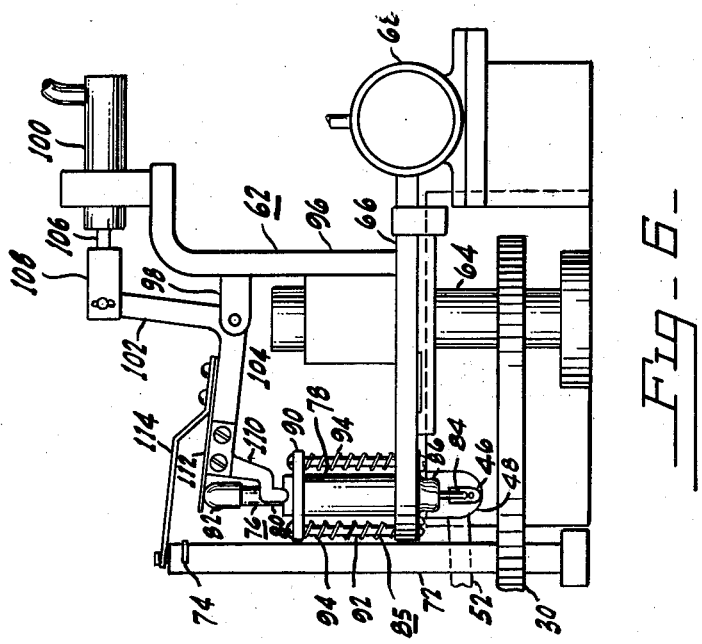
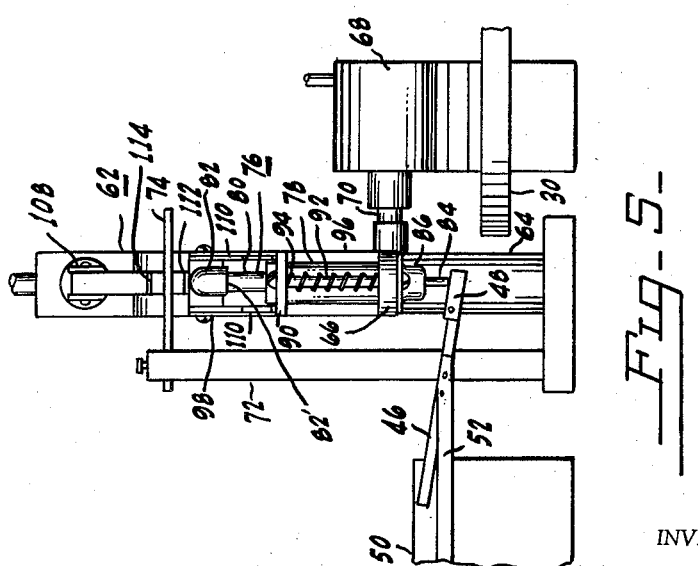
INVENTOR.
WALTER A. PREUSS
BY
William A. Zalesak
ATTORNEY Sept. 10, 1963 W. A. PREUSS 3,103,283
APPARATUS FOR FEEDING PARTS
Filed Aug. 8, 1960 4 Sheets-Sheet 4
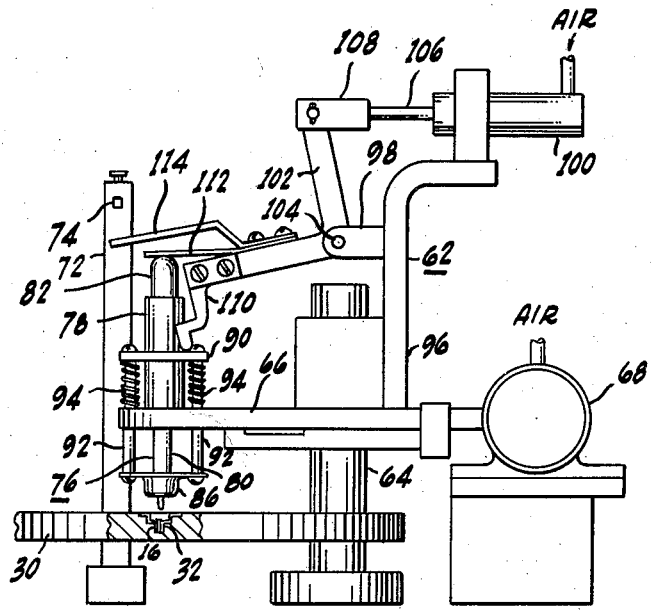
Fig-7-
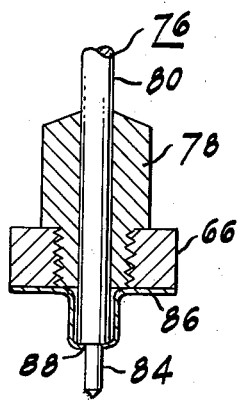
Fig-8-
INVENTOR.
WALTER A. PREUSS
BY
William A. Zaleoak
ATTORNEY United States Patent Office 3,103,283
Patented Sept. 10, 1963

3,103,283
APPARATUS FOR FEEDING PARTS
Walter A. Preuss, West Orange, N.J., assignor to Radio Corporation of America, a corporation of Delaware
Filed Aug. 8, 1960, Ser. No. 48,218
10 Claims. (Cl. 214—1)

My invention relates to apparatus for feeding parts one by one from a storage means and delivering each part individually to a work station.

In a particular use, apparatus according to the invention is employed for feeding properly oriented tube electrode flanges one by one along a chute, and transferring the flanges from the chute one at a time into a well in a turret, the well supporting therein a cooperating tube element. However, the invention has broader applications.

In a certain construction of vacuum tubes, each tube electrode is supported at one end thereof by means of a flange. The tube elements and their flanges are mounted concentrically. The tube flanges are mounted coaxial with each other in spaced parallel planes. Each flange is supported by conductors or support rods which extend into an insulating base. The tube elements and the flanges may be very small. In one case, for example, the grid flange is about ¼ inch in diameter and has a central tubular portion into which the grid of about 1/16 of an inch in diameter is fitted. Assembly of such a tube by hand properly and without damaging the tiny elements is time consuming and requires skilled operators.

It is an object of my invention to provide apparatus for transferring a part properly oriented from one position to another position for engagement with another part at the other position.

It is a more specific object of my invention to provide an apparatus for feeding tube parts one at a time from a storage means to a receiving means at a work station with the part in properly oriented position to engage another part to which it is to be secured.

It is a still more specific object of my invention to provide such an apparatus for feeding an electrode flange from a reservoir and transferring said flange properly oriented to a receiving means supporting a tubular electrode in proper position to be engaged by said flange in a coaxial relationship.

Apparatus made according to my invention includes a vibratory means for feeding electrode flanges properly oriented to a longitudinally vibrational chute, a quill means for taking the flanges one by one out of the end of the chute and carrying a flange to an assembly dial having a well containing a tubular tube part therein at a work position, and means for stripping the flange from the quill at the work position to engage said flange and said tubular electrode in coaxial relationship.

In the following more detailed description of this invention, reference is had to the several figures of the drawing, in which:

FIG. 1 is a longitudinal section of an electron tube of the type described and in the assembly of which apparatus as made according to my invention is utilized;

FIG. 3 is a sectional view on line 3—3 of FIG. 2 showing how a properly oriented flange passes an obstruction in the flange feeding device;

FIG. 4 is a sectional view on line 3—3 of FIG. 2, showing how an improperly oriented flange is rejected;

FIG. 5 is a front elevation of a flange transfer apparatus of my invention at its flange pick-up position;

FIG. 6 is a side elevation of the flange transfer apparatus shown in FIG. 5 and also in its flange pick-up position;

FIG. 7 is a side elevation of the flange transfer apparatus shown in FIG. 5 in its flange release position; and FIG. 8 is an enlarged longitudinal section of the quill and stripper used in the transfer mechanism.

Figure 2:
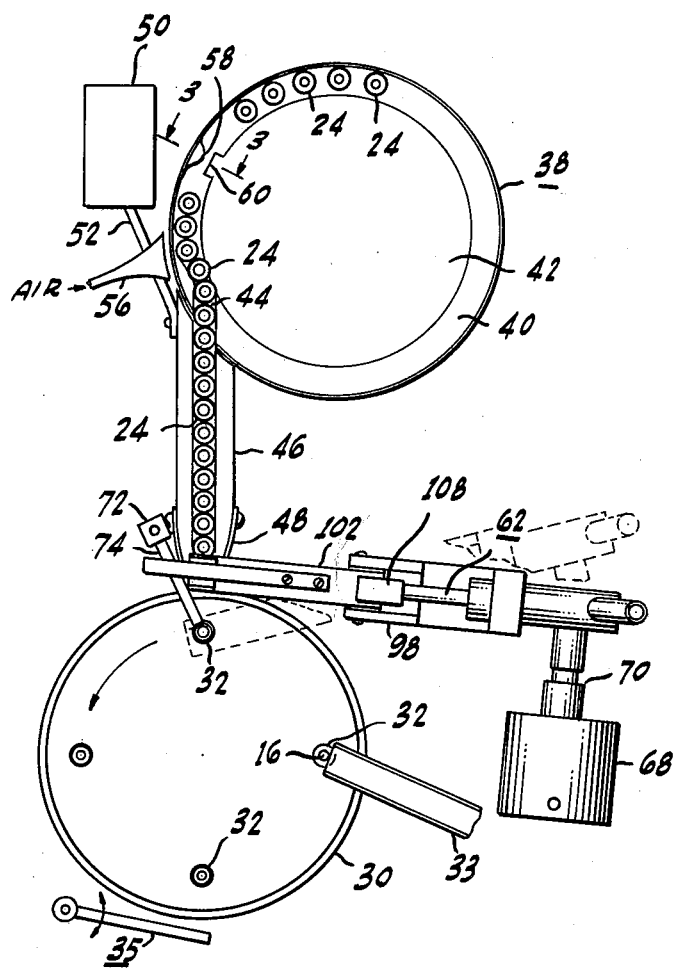
FIG. 2 is a plan view of a flange feeding and orienting means and of a flange transfer apparatus, made according to my invention.

FIG. 1 illustrates a vacuum tube which may be of small dimensions and in the assembly of which apparatus made according to my invention finds utility. In this tube structure, the envelope 10 is closed at one end by the ceramic wafer or header 12. Concentrically mounted in envelope 10 are the anode 14, grid 16 and cathode 18. The anode 14 is mounted on and integrally joined to its flange 20. The flange 20 is integrally joined to a plurality of pins 22, of which only one is shown. All of these pins extend into the header 12 to provide mechanical support for the flange and the anode, and at least one of these pins extends through the base to provide electrical connection to the anode. Similarly, the grid 16 is mounted on its flange 24 and the cathode 18 is mounted on its respective flange 26 and the flanges are each mounted on their respective pins of which only a few are shown. The heater 28 extends into the cathode and has electrical connections to pins which extend through the base 12. It will be noted that the two sides of the flange are differently shaped and that a flange must be properly oriented to permit assembly of a tube electrode to its flange.

The electrode elements of a vacuum tube of the type just described may be of very small dimensions, for example, the grid 16 may be 1/16 of an inch in diameter and the grid flange 24 may be ¼ of an inch in diameter, the other elements being proportionately small. As pointed out above, the manual assembly of such vacuum tube parts, due to the necessity of orienting the flanges and due to the small size, fragility and close spacing of the elements thereof is a slow tedious job which requires skilled operators.

Apparatus made according to my invention is particularly adapted to orient a flange and assemble it with its associated tube elements. The apparatus will be described, however, only in connection with the assembly of a grid flange and its associated grid.

In general, as shown in FIG. 2, apparatus according to my invention includes a vibratory feeder 38 having an obstruction 58 and cut-out portion 60 in the track 40 thereof for selecting properly oriented grid flanges, a chute 46 for feeding properly oriented flanges to a pick-up point, a quill assembly 62 for picking up flanges one at a time at said pick-up point and for carrying the flanges to an assembly point, the quill device 76 of assembly 62 including a stripping means 86 (FIGS. 5-7) for stripping a flange from the pick-up means at the assembly point or station of the device, a bar 74 for stopping and guiding the pick-up means, and an indexable turret 30 for presenting an assembly well 32 containing a grid 16 to said assembly point or work position.

The grid flange 24, as shown in FIGS. 3 and 4, has a larger rim portion 34 and a smaller cylindrical or tubular grid-receiving portion 36 integrally formed therewith. Since the grid has already been supplied to the parts well 32 in the turret 30 when the parts well 32 is indexed to the flange supplying means, the flange should be so oriented, when it is dropped into the parts well, that the grid receiving portion 36 is down.

The device for selecting properly oriented grid flanges and feeding them through the chute to a pick-up point is shown in FIGS. 2, 3 and 4. In FIG. 2, a known vibrating feeder 38 is illustrated. This vibrating feeder 38 has a helical feeding track 40 around the periphery thereof and a central reservoir 42 for receiving parts therein, here shown as grid flanges 24. The track 40 of the feeder is cut away as at 60 and an obstruction 58 partially blocks the track for the purpose of rejecting incorrectly oriented flanges. The vibrating feeder 38, in its operation, is rotationally vibrated, whereby the grid flanges enter the track 40 and proceed up it in a counter-clockwise direction, and pass the obstruction 58 and the cut-out portion 60. As noted, the two sides of a flange 24 are differently shaped. A flange 24 comprises a short-cylindrical portion 36 and a larger diameter rim portion 34. The obstruction 58 is made to fit under the rim 34 when a flange 24, which is oriented with its rim 34 up, moves past it, as shown in FIG. 3. However, when a flange 24 having a downwardly oriented rim portion 34 arrives at the obstruction 58, the obstruction pushes the flange 34 laterally of the track 40 to the point where it falls off the track at the cut-out portion 60 thereof. The feeding track 40 has a discharge opening 44 through which grid flanges are fed to an adjacent track or storage means comprising chute 46. Spring fingers 48, fastened to the sides of the chute 46 have ends which extend across the discharge end of the chute 46. The chute 46 is not fastened to the vibratory feeder 38 but is closely adjacent thereto as shown. A separate vibrator 50, which vibrates the chute in a longitudinal direction to assist feeding the flanges down the chute 46, is mechanically connected to the chute 46 by the link 52.

A nozzle 56 is provided to blow air across the top of track 40 for a purpose to be explained below.

The device for picking up flanges at a pick-up point and carrying them to an assembly point is shown in FIGS. 2 and 5 to 8. This device takes flanges 24 out of the chute 46 one at a time and deposits them in the well 32 of the indexing turret or dial 30. This pick-up and carrying device comprises a quill assembly generally indicated as 62. The quill assembly 62 includes the flange pick-up and carrying means as well as a stripper means.

The pick-up and carrying device comprises a vertical stanchion or support 64. A cross-arm 66 is mounted for rotation about the stanchion 64. The cross arm 66 is caused to be rotated about the vertical stanchion by compressed air cylinder 68, which is pivotally linked to an end of arm 66 as by piston rod 70. Upon admitting compressed air to the cylinder 68, the quill assembly 62 is rotated about the stanchion 64 in a counter-clockwise direction to a position shown in dotted lines in FIG. 2. The cylinder has a spring therein, (not shown) which, upon opening the air cylinder to atmospheric air pressure, returns the quill means to the position shown in FIGS. 5 and 6 and in full lines in FIG. 2.

The pick-up means comprises a quill guide 78 (see FIGS. 5 to 8) which is threaded into the end of cross-arm 66 opposite to the end that is linked to the air cylinder 68. A quill 76 is mounted to slide in said quill guide 78. The quill 76 is circularly cylindrical in cross section and has a central portion 80 of a diameter to fit a hole in the guide 78, and an enlarged upper portion 82 having a shoulder stop 82' and a small diameter lower portion 84 forming a flange pick-up portion.

A flange stripper means cooperates with the lower quill portion 84. The stripper comprises a stripper element 86. The element 86 is a metal plate with a cup portion in the middle thereof large enough to receive the center portion 80 of the quill 76. A hole 88 (FIG. 8) is provided in the bottom of the cup portion of the stripper element 86. This hole is large enough to receive the lower portion 84 of the quill 76 but too small to receive the central portion 80 of the quill 76. The flange stripper further comprises an upper plate 90 which slidably fits quill guide 78. The plate is spaced from and fastened to stripper plate 86 by rods 92. Compression springs 94, placed between the top of arm 66 and the bottom of upper plate 90, urges plate 90, and therefore stripper plate 86, upwards. The springs 94 also urge the quill 76 upwards when the lower end of the central portion 80 of the quill 76 rests against the bottom of the cup of the stripper plate 86.

The flange pick-up and stripper means also includes means for causing vertical downward motion of the quill means and for causing relative motion of the stripper plate 86 and the quill 76. This means comprises a vertical support 96 fastened to the arm 66 for rotation therewith. This vertical support 96 has a pair of ears 98 extending laterally therefrom in the direction towards the quill 76. The upper portion of the support 96 is curved to lie in a horizontal plane and supports in air cylinder 100 thereon. An L-shaped lever 102 is pivoted at 104 between the ears 98. The vertically extending end of the lever 102 is linked to the piston rod 106 of the air cylinder 100 by means of yoke 108. The horizontal end of the bent lever 102 has a pair of pushers 110 fastened thereto, one on each side of the lever 102. These pushers extend downwardly from the end of bent lever 102, clearing quill guide 78, and overlying upper plate 90. A flat spring 112 is fastened to the top of lever 102 and extends beyond the end thereof sufficiently to overlie the enlarged head 82 of the quill 76. A stop bar 114 is also fastened to the top of lever 102 and extends beyond the end of spring 112 to such an extent that the end of the bar 114 overlies the horizontal arm 74 mentioned above. As shown, the bar 114 is bent upwardly and then outwardly, whereby the end of the bar 114 is above and parallel to the horizontal portion of the lever 102.

The indexable means used in this machine for assembling the grid flange to the grid includes an indexable turret 30, see particularly FIG. 7. The turret has a well 32 therein at each indexed position thereof. A grid 16 is placed in the well 32 of the turret 30 by apparatus, such as a V-shaped chute 33, FIG. 2, at one indexed position of the turret, or the grid may be placed into the well by hand. The turret is then indexed 90° and the well is presented to the present apparatus for supplying flanges 24 to the well 32. An apparatus 35 is supplied to remove a grid and its flange from another indexed position of the turret. This apparatus 35 may be a quill means, which is inserted into the grid and flange assembly and which lifts the assembly out of the well 32 and deposits it into a jig (not shown). Since the removing means 35 is not part of this invention, it is not further described.

The stopping and guide means includes a vertical support 72 (FIG. 6), positioned adjacent the end of cross arm 66 remote from the air cylinder 68. The vertical support 72 carries a horizontal bar 74 near the top thereof. The bar 74 extends horizontally in a direction towards the indexed position of the well 32 of the turret 30 and terminates just short of the point directly over the center of a well 32. This stopping and guiding means 74, in the first instance, prevents quill 76 from going down too far by contact of stop bar 114 on top of stop and guide bar 74. Thereby, the stopping and guide means 74 stops the quill in its downward motion at its flange pick up position. Furthermore, upon rotation of cross-arm 66 to the point where quill 76 is directly above well 32, the stop bar 114 slides off the end of guide bar 74. Thus, the stopping and guiding means 74 releases the quill for further downward motion after rotation thereof to the flange feeding position.

The operation of the apparatus for orienting grid flanges and for feeding them one at a time to the parts well 32 in the indexing turret 30 is as follows:

Referring to FIGS. 2, 3 and 4, flanges 24 are placed in reservoir 42 of vibratory feeder 38. These flanges are fed upwards along the helical path of track 40 in a counter-clockwise direction in a known manner and are discharged through discharge opening 44 into chute 46. However, the grid flanges that are fed by the track means may have the flat portion up on top or the cylindrical portion on top. Since, as explained above, only flanges having the flat portion on top can be assembled to a grid by this machine, the means 58, 60, which are explained above, are provided for rejecting incorrectly oriented flanges. Thereby, only flanges that are oriented to such position that the flat portion 34 is upward will approach the discharge opening 44 of the vibratory feeder 38. Occasionally, however, a flange will ride on another flange in the helical track 40 of the vibratory feeder 38 whereby two flanges, one on the other, will be presented to the discharge opening. To prevent this, the air nozzle 56 is provided to blow air across the top of the track 40 to blow the upper flange (if any) back into the reservoir 42.

The flanges that leave the track 40 enter the chute 46, which, as is noted above, is not fastened to vibratory feeder 38 but is vibrated longitudinally by vibrator 50. Due to this longitudinal vibration, these flanges 24 are fed along the chute 46 and fill it. The spring fingers 48 oppose feeding of flanges 24 out of the discharge end of the chute 46.

The feeding of flanges one by one from the end of the chute 46 and into the parts well 32 in the indexing turret 30 is explained in connection with FIGS. 2, 6 and 7. In the beginning of the cycle, the quill means 62 is in the position shown in FIGS. 5 and 6 and in solid lines in FIG. 2. In this position, the quill 76 overlies the end of the chute 46 and the smaller diameter portion 84 of the quill 76, which fits the grid hole in the flange 24 registers with the hole in the flange 24. Compressed air is admitted to the cylinder 100 and the piston rod 106 is moved outwardly, pushing the horizontal portion of the bent lever 102 downwardly. The flat spring 112 pushes down on the enlarged top portion 82 of the quill 76 and the lower shoulder of the quill 76 pushes down on the cup of plate 86. Thereby, the quill 76 and the stripper plate 86 move down together. The smallest portion 84 of the quill enters the hole in the flange 24 and at this time, the stop bar 114 comes into contact with the horizontal bar or arm 74, preventing further downward motion of the arm 102. Compressed air is then admitted to cylinder 68, whereby the piston rod 70 rotates the quill assembly 62 counter-clockwise about its stanchion 64, causing the lower end of the quill 84 to pull a flange 24 out of the chute 46 against the opposition of spring fingers 48. As the quill assembly rotates, the stop bar rides along horizontal bar 74 and falls off the end thereof at the point where the quill 76 is in registry with the parts well 32. At this point, the quill assembly is in the position shown in dotted lines in FIG. 2. The air cylinder 68 has completed its pushing operation, but the air cylinder 100 continues to push outwardly on the vertical end of the lever 102. When the stop 114 rides off the end of bar 74, the lever 102 is permitted to rotate further about its pivot 104, and the horizontal portion of the lever arm 102 continues downwardly carrying with it the flat spring 112 and the pushers 110. The flat spring 112 moves the quill 76 and the stripper 86 downwardly together until the shoulder 82' of the quill 76 engages the top of quill guide 78. At this time the bottom end of the smallest diameter portion 84 of the quill 76 is directly above the parts well 32. As the lever 102 continues to rotate, the leaf spring 112 bends, the pushers 110 continue to move the upper plate 90 of the stripper and therefore the stripper 86, downwardly relative to the quill 76 thereby positively stripping the grid flange from the quill portion 84 and permitting the grid flange to fall into the parts well 32. A grid has already been fed to this parts well 32 by means of chute 33. At this point, the quill means 62 is in the position shown in FIG. 7. Atmospheric pressure is then restored to the air cylinder 100 and the spring (not shown) in cylinder 100 causes the piston rod 106 to retract, the lever 102 is restored to its original position and the springs 94 move the upper plate 90 and therefore the stripper 86 and quill 76 upwards. Atmospheric pressure is restored to air cylinder 68 and the spring (not shown) in that cylinder retracts piston rod 70, rotating quill assembly 62 to the position shown in FIG. 2 in full lines. The means 35 removes a grid and flange assembly from another indexed position of the turret 30 and places it in a jig (not shown). A cycle has been completed.

If the stop bar 114 on the horizontal part of the lever 102 and the cooperating horizontal stopping bar means 72 are omitted, the downward motion of the quill 76 is stopped by the back pressure of the flange 24 in the chute 46 on the quill 76, or by the contact of the end of the quill 76 with the bottom of the chute 46. In the absence of the stop bar 114 and the horizontal bar 74, the quill 76 and the stripper 86 will move downwardly as soon as the quill 76 has forced a flange 24 laterally out of the end of the chute 46 against the opposition of the spring fingers 48. The stop bar 114 and the horizontal bar 74 comprise a guiding means which has the dual function of limiting the downward motion of the quill and stripper at its pick-up position and of preventing downward motion of these parts until the quill registers with the assembly well.

The admission of compressed air to cylinders 68 and 100 in the timed relation mentioned hereinabove, may be accomplished by any well known cam and solenoid valve means.

While this invention has been described in connection with orienting, transferring and feeding grid flanges, any part having the shape of two cylinders of different diameters concentrically arranged end to end may be oriented by the apparatus of this invention. Also, any part having a hole therein may be transferred by the quill assembly of this invention from the end of a chute to an assembly point. Furthermore, quill 76 may be of magnetic material to thereby attract a magnetic part or it may have ducts leading to the surface of the cylindrical portion 84 thereof so that the part may be held on the quill by air suction, or the cylindrical portion 84 may be treated to give its cylindrical surface a higher coefficient of friction for better holding a part on the quill.

What is claimed is:

1. Apparatus for transferring parts comprising a support, an arm extending laterally from said support, a quill means mounted on said arm and extending laterally of said arm, a stripper means mounted on said arm for cooperation with said quill means, means for moving said quill means transversely of said arm, stop means for stopping further transverse motion of said quill means, said stop means extending for a predetermined distance in a direction transverse to the direction of motion of said quill means, means to rotate said arm beyond said stop means, means for further moving said quill means, further stop means for stopping further motion of said quill means and means for further moving said stripping means with relation to said quill.

2. Apparatus for transferring parts comprising a support, an arm extending laterally from said support, quill means extending laterally from said arm, resilient means for moving said quill means laterally of said arm, stop means for stopping said motion of said quill means, said stop means extending laterally of the length of said arm and having an end and means for rotating said arm about said support beyond the end of said stop means, whereby said resilient means causes further motion of said quill means.

3. Apparatus for transferring a part having a hole therein from a chute having a discharge end and having resilient means at least partially closing said chute to a parts receiving well, said apparatus comprising a support, a cross arm rotatably mounted on said support, a bearing on said cross arm, a quill means slidably mounted in said bearing, said quill means having a stop portion at one end thereof, and a cylindrical portion of reduced diameter fitting the hole in said part at the other end thereof, a stripper comprising an element having a hole therein, said cylindrical portion extending through said hole in said stripper, resilient means supporting said stripper on said arm, means to move said stripper laterally of said arm and against said resilient means, spring means to move said quill means laterally of said arm until stopped by said stop, and means for rotating said arm about said support.

4. Apparatus for transferring a part having a hole therein from a chute having a discharge end and having resilient means at least partially closing said chute to a parts receiving well, said apparatus comprising a support, a cross arm rotatably mounted on said support, a bearing on said cross arm, a quill means slidably mounted in said bearing, said quill means comprising a section having a diameter greater than said bearing diameter and a tubular portion of reduced diameter, stripper means having an opening therein positioned so that said portion of reduced diameter extends through said opening, means to rotate said arm until said quill registers with the hole in said part in said chute, means to move said quill in a direction parallel to its length until said quill enters the hole in said part and engages said part, means to rotate said arm in a direction to pull said part out of said chute against the opposition of said resilient closing means, and until said quill registers with said parts receiving well, means to further move said quill in said direction parallel to its length until said greater diameter portion of said quill engages said bearing, and means to move said stripper along the length of said reduced portion of said quill whereby said part is stripped from said quill and falls into said well.

5. Apparatus for transferring a part from a source of supply to a work station including a support, an arm rotatably mounted on said support, an elongated parts engaging element slidably mounted on said arm, a stripper engaging one end of said parts engaging element, biasing means on said support and connected with said element and said stripper for maintaining said element and stripper in one position relative to said arm, means on said arm connected to said stripper and said element for moving said stripper and said element to a first position at said source of supply to engage a part, said last means having other means for causing relative movement of said element and said stripper upon rotation of said arm to strip a part engaged by said element from said element, said means for causing relative movement including a second arm mounted on said first mentioned arm and rotatable about an axis perpendicular to said support, said second arm comprising resilient means for sliding said parts engaging element.

6. Apparatus for transferring and inserting parts into a receptacle, said apparatus comprising a reservoir adapted to contain and supply said parts, a support mounted adjacent said reservoir, and a receptacle mounted adjacent said support, an arm on said support, quill means mounted on said arm, means to move said quill means transversely of said arm in a predetermined direction for a predetermined distance for engaging a part at said parts reservoir, means for rotating said arm about said support through a predetermined angle and between said parts reservoir and said receptacle, and means for further moving said quill means in said predetermined direction after the said rotation through said predetermined angle for inserting a part into said receptacle.

7. Apparatus for transferring and inserting parts into a well, said apparatus comprising a dispenser of parts, said dispenser being at a first level, a rotatable support mounted adjacent said dispenser, and a well for receiving a part, said well being at a second level displaced from said first level, an arm extending laterally from said support, a quill means mounted on said arm, a stripper means mounted on said arm for cooperation with said quill means, means for moving said quill means transversely of said arm and in a direction from said first level towards said second level for engaging a part in said dispenser, means for rotating said support through a predetermined angle and between said dispenser and said well, means for further moving said quill means in said direction and for a predetermined distance after said rotation through said predetermined angle for inserting a part into said well, and means for moving said stripper means with relation to said quill means.

8. Apparatus for transferring and inserting into a well parts having holes therein from a chute having a discharge end and spring fingers at least partially closing said discharge end, said apparatus comprising a chute, a well, and a quill means mounted for movement between said chute and said well, means for moving said quill means in a first direction to insert said quill means into the hole in the part to be transferred, means to move said quill in a direction transverse to said first direction to discharge said part from said chute against the opposition of said spring fingers and to dispose said quill means in registry with said well, and means to further move said quill in said first direction for inserting said part into said well.

9. Apparatus for transferring a part from a source of supply to a work station including a support, an arm rotatably mounted on said support, an elongated parts engaging element slidably mounted on said arm, a stripper engaging one end of said parts engaging element, biasing means on said support and connected with said element and said stripper for maintaining said element and stripper in one position relative to each other, means on said arm connected to said stripper and said element for moving said stripper and said element to a first position at said source of supply to engage a part while said stripper and said element are maintained in said one position, said last means having means for causing relative movement of said element and said stripper upon rotation of said arm to said work station to strip a part engaged by said element from said element.

10. Apparatus for transferring a part from a source of supply to a work station including a support, an arm rotatably mounted on said support, an elongated parts engaging element slidably mounted on said arm, a stripper engaging one end of said parts engaging element, biasing means on said support and connected with said element and said stripper for maintaining said element and stripper in one position relative to each other, means on said arm connected to said stripper and said element for moving said stripper and said element to a first position at said source of supply to engage a part while said stripper and said element are maintained in said one position, said last means having other means for causing relative movement of said element and said stripper upon rotation of said arm to said work station to strip a part engaged by said element from said element, said means for causing relative movement including means for overcoming said biasing means.

References Cited in the file of this patent

UNITED STATES PATENTS

| | | |
|---|---|---|
| 1,362,286 | Gerhardt | Dec. 14, 1920 |
| 2,025,935 | Burns | Dec. 31, 1935 |
| 2,060,182 | Dellaree | Nov. 10, 1936 |
| 2,122,265 | Prendes | June 28, 1938 |
| 2,251,158 | Ogrodowy | July 29, 1941 |
| 2,639,034 | Roeber | May 19, 1953 |
| 2,661,833 | Spurlin | Dec. 8, 1953 |
| 2,829,782 | Roeber | Apr. 8, 1958 |
| 2,877,541 | Bishop | Mar. 17, 1959 |
| 2,889,057 | Gartner | June 2, 1959 |
| 2,891,668 | Hunt | June 23, 1959 |
| 2,914,843 | Peterson | Dec. 1, 1959 |
| 3,010,587 | Hollinger | Nov. 28, 1961 |
| 3,036,719 | Dick | May 29, 1962 |